March 19, 1940. T. H. SCHOEPF ET AL Re. 21,404

MAGNETIC BRAKE

Original Filed Nov. 27, 1934 3 Sheets-Sheet 1

INVENTORS
THEODORE H. SCHOEPF,
DAVID M. RITCHIE.
BY
ATTORNEY

March 19, 1940. T. H. SCHOEPF ET AL Re. 21,404

MAGNETIC BRAKE

Original Filed Nov. 27, 1934 3 Sheets-Sheet 2

INVENTORS
THEODORE H. SCHOEPF,
DAVID M. RITCHIE.
BY A. M. Wiggins
ATTORNEY

MAGNETIC BRAKE

Original Filed Nov. 27, 1934 3 Sheets-Sheet 3

INVENTORS
THEODORE H. SCHOEPF,
DAVID M. RITCHIE.
BY
ATTORNEY

Reissued Mar. 19, 1940

Re. 21,404

UNITED STATES PATENT OFFICE 21,404

MAGNETIC BRAKE

Theodore H. Schoepf and David M. Ritchie, Cincinnati, Ohio, assignors, by mesne assignments, to The Westinghouse Air Brake Company, Wilmerding, Pa., a corporation of Pennsylvania Original No. 2,062,192, dated November 24, 1936, Serial No. 755,024, November 27, 1934. Application for reissue December 21, 1939, Serial No. 310,468

22 Claims. (Cl. 303—3)

Our invention relates to rail brakes for railway cars.

It is the object of our invention to provide for an emergency application of the rail brakes in the event the main power source is disrupted while the car is running or at rest. This power source may be a trolley wheel, harp and pole engaging a trolley wire or a contact shoe engaging a third rail. In any event, the disruption of the main power circuit will result in the application of the rail brakes in order to bring the car to rest.

It is a further object to provide for a magnetic rail brake, means to energize it, and means to position it normally operable from the motorman's position at his controller and to provide in combination with it automatic means for applying the rail brake in the event that the main power source is disrupted.

Referring to the drawings.

Figure 1:
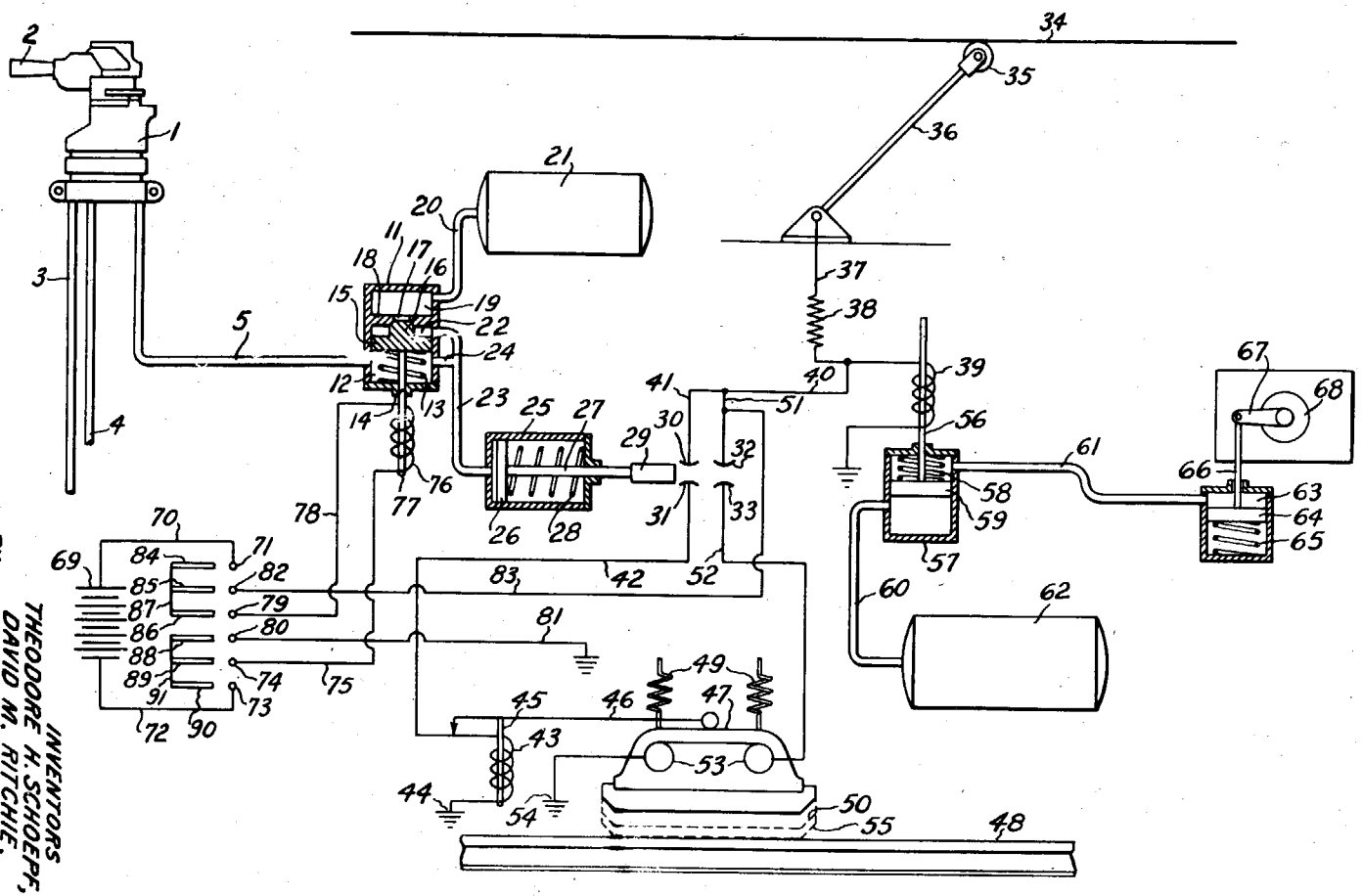
Figure 1 is a diagrammatic view partially in section showing the arrangements of the several parts when the car is running or at rest. The braking mechanism is inoperative and the main power source is connected in circuit.
Figure 2:
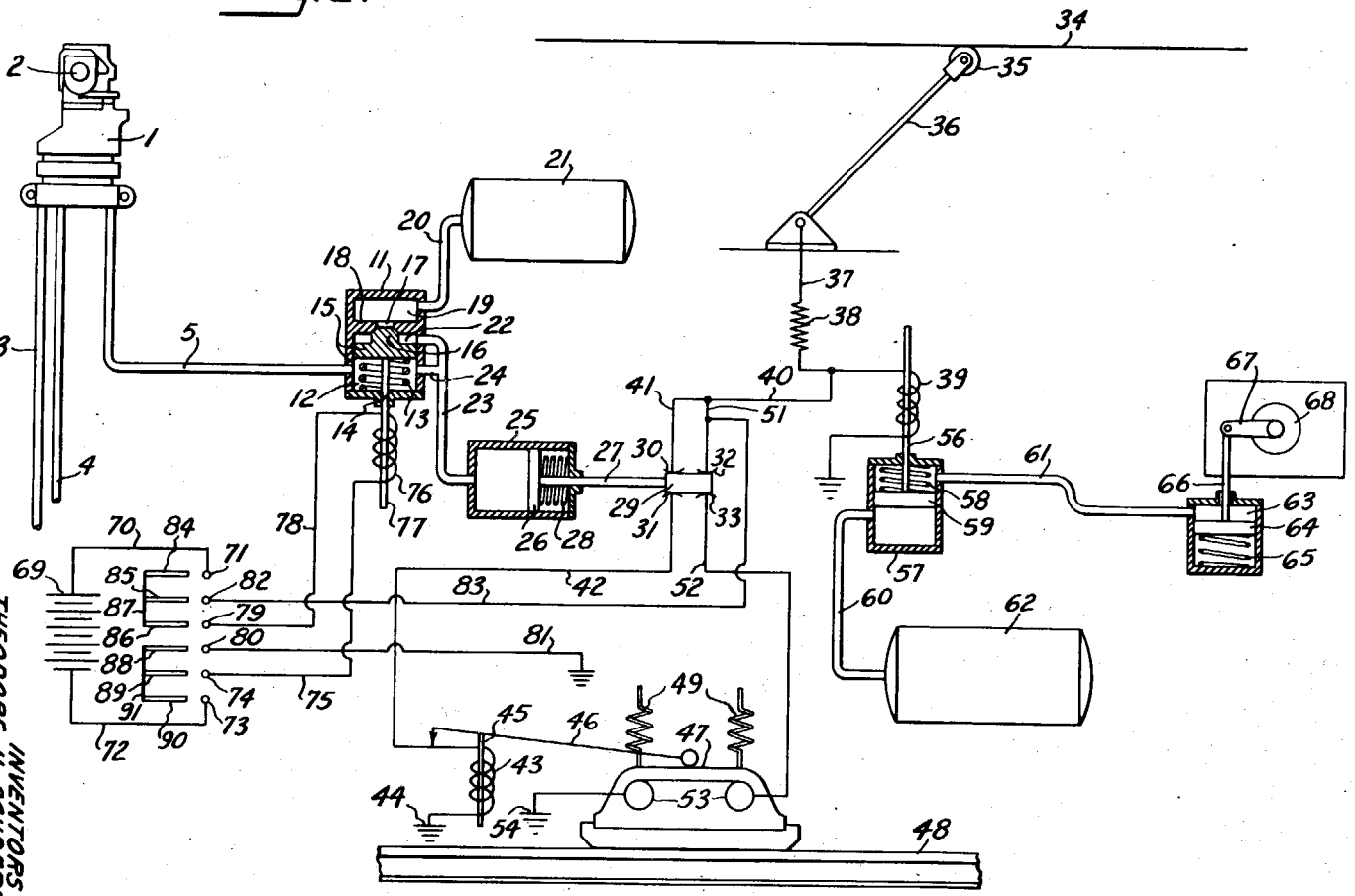
Figure 2 is a similar view with the parts in position for a normal application of the magnetic rail brakes with the main power source connected in circuit.
Figure 3:
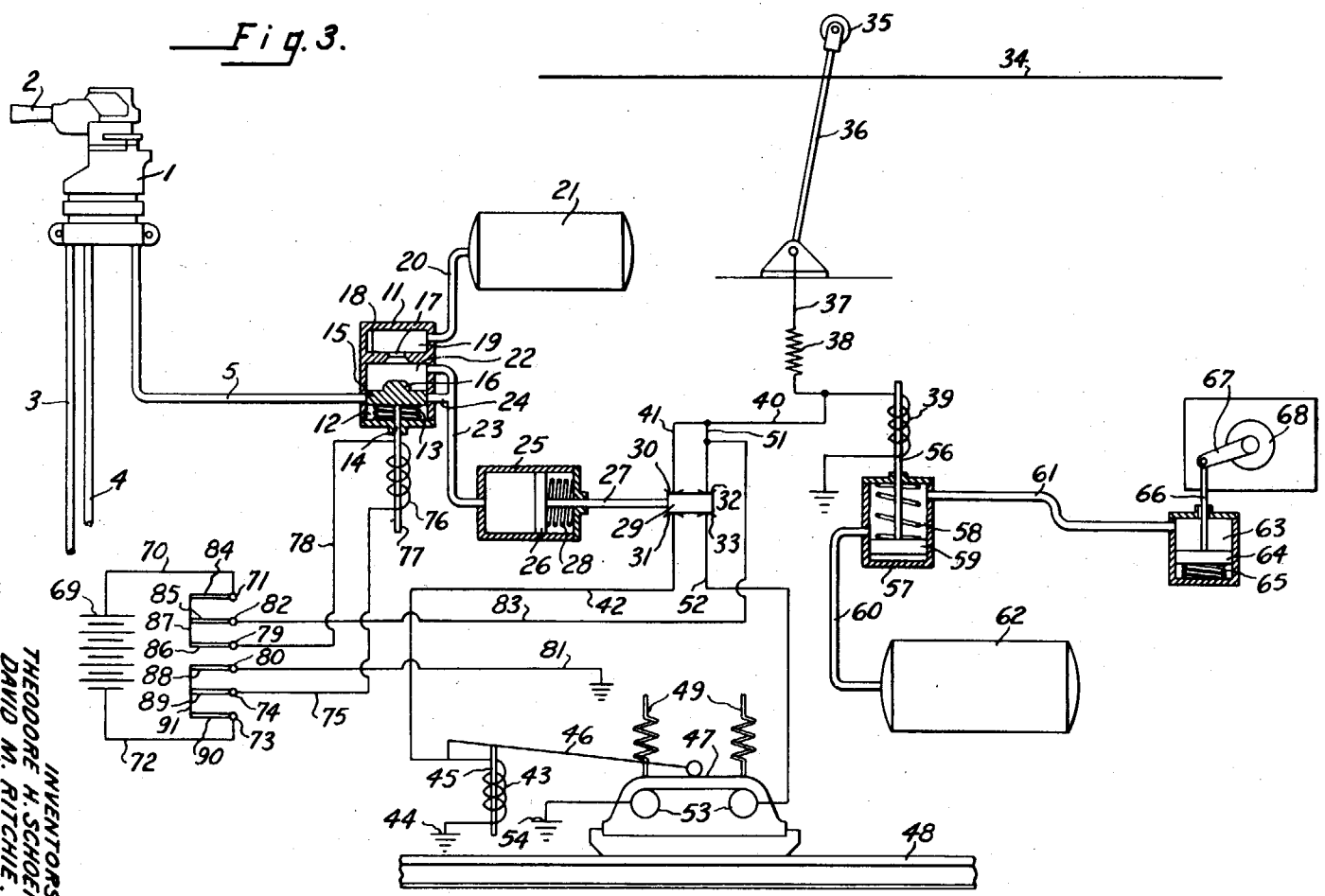
Figure 3 is a similar view with the main power source disrupted showing the application of the magnetic rail brakes in such an event.

Referring to the drawings in detail, 1 is a controller for the air having the controller handle 2. 3 designates the air supply line and 4 the exhaust line. 5 designates the straight air line communicating with the valve 11, when the main power source 34 is intact as in Figs. 1 and 2; while as shown in Fig. 3, the valve 11 communicates with the emergency air line 21, 20 and 23, when and if the power source 34 becomes inoperative from any cause. In the chamber 12 of the emergency valve 11 there is a spring 13 surrounding the rod 14. The spring 13 serves to push upwardly the piston valve member 15 which has a valve head 16 which controls the flow of air through the opening 17 in the partition 18. The partition 18 separates the chamber 12 from the chamber 19. The chamber 19 is supplied with compressed air from the pipe 20 and tank 21. The tank 21 is supplied with air at a constant pressure by any well known means. A space 22 between the partition 17 and valve member 15 is connected to a pipe 23. The chamber 12 is connected by the pipe 24 to the pipe 23.

The pipe 23 leads to a circuit closing means designated 25 comprising an air cylinder having a piston 26, piston rod 27 and a spring 28 resisting the movement of the piston and piston rod. Air from the pipe 23 is introduced on the side of the piston 26 opposite to that on which is located the spring 28. The free end of the piston rod 27 carries the contact head 29 which is adapted to successively engage with and bridge the contacts 30, 31, 32 and 33 in the respective rail brake shoe applying circuit and rail brake shoe magnet energizing circuit.

*Rail brake shoe applying circuit*

The source of electrical power may be a trolley wire or third rail or any other means of supplying current. In this instance it is designated 34. It supplies current through the wheel and harp 35, pole 36 and thence through the wire 37, resistance 38, solenoid coil 39 or as sometimes called colloquially, "a no voltage relay", wire 40 and wire 41 to the contact 30, thence through the switch closing member 29, contact 31, wire 42 and solenoid coil 43 to ground 44. The energization of the coil 43 actuates the solenoid core 45, which in turn moves through suitable intermediate devices such as levers or any other means designated generally at 46 the rail brake shoe 47 into engagement with the rail indicated at 48. The shoe is normally maintained either by springs, pneumatic or hydraulic pressure or any other suitable means a safe distance from the rail. This is usually from two to three inches and sufficiently remote customarily from the rail to be out of any active magnetic zone. Ordinarily it would be too expensive to provide a magnetic rail shoe which could be drawn from such a remote position into engagement with the rail so that it is desirable to move the shoe into proximity with the rail 48 before completing the energization of the rail brake magnets. These suspension means are designated generally 49. By the energization of the rail brake shoe applying circuit, the rail is brought within energizing position as indicated by the numeral 50 and the dotted lines to which the numeral is applied.

The foregoing operation or action of the parts takes place when it is desired to apply or position the brake shoes to the rails to check the speed of the train or to both check it and stop the train. By turning the handle 2, air from the air controller 1 is admitted to the pipe 5, and thence into the cylinder 12 and on to the pipes 24 and 23, and thence into the cylinder 25 to actuate the piston 26 and the contact 29. When the contact engages points 30 and 31, the result is to cause a movement in the solenoid core 45 to actuate mechanism 46 which causes a movement of the brake-shoe 50 from its normal suspended safe position above the rail, to a position within the magnetic field between the brake-shoe and the rail. While these actions are taking place, and they are practically instantaneous from the time the contact 29 engages points 30 and 31, the continued air pressure on the piston 26 will move the contact 29 into engagement with the points 32 and 33. This closes the circuit which magnetized the magnet coils 53 and creates a magnetic field between the brake shoe and the rail. The shoe snaps down on the rail and by its application to the rail, the speed of the train is reduced, and if continued long enough will stop the train. So that when the train is to be slowed down in speed, or both slowed down and actually stopped, the air controlling handle 2 is manipulated as stated and the rest of the operations immediately take place.

*Rail brake shoe applying circuit*

Upon the contact member 29 being moved into engagement with the contacts 32 and 33, the following circuit is established. The wire 51 connected with the wire 40 is connected with the contact 32. The contact 33 is connected to the wire 52, which in turn is connected to the magnet coils 53 in the rail brake shoe 47. These coils are in turn connected with the ground 54. The energization of the magnets serves to draw the rail brake shoe down into braking engagement from the position 50 into the position designated as 55 in engagement with the rail. The rail brake shoe applying circuit may be continued until the speed of the train is reduced as desired, or until the train is stopped.

*Rail brake emergency circuit*

In the event that the main power source is disrupted, the solenoid coil 39 is deenergized so that its solenoid core 56, which is a part of and forms a piston rod for the emergency controller air valve 57, is permitted to move downwardly under the force of the spring 58 behind the piston 59 working in the valve 57. This results in permitting air to flow from the pipe 60 to the pipe 61. The pipe 60 is supplied with air either from the tank 21 or another tank 62. The tank 62 is suitably supplied with a constant pressure of air. Compressed air is therefore applied at 63 behind the piston 64 compressing the spring 65. This serves to move the piston rod 66 which is connected to the arm 67 on the drum controller 68. The opening through which the piston rod 66 passes is slightly larger than the rod and consequently air in the space 63 will gradually exhaust under the pressure of the spring against the lower side of the piston 64. See Fig. 3 particularly. This provides for the return movement of the piston 66.

For the purpose of clarity, the internal contacts and the wiring of the controller 68 are shown on the left hand of the drawings. The application of the air as described serves to close the contacts on the controller and to bring in circuit with the rail brake shoe applying circuit and the rail brake shoe energizing circuit an emergency source of electrical energy such as the battery 69. This battery is connected by the wire 70 to the contact terminal 71. The other side of the battery is connected by the wire 72 to the terminal 73. The terminal 74 is connected by the wire 75 to the solenoid coil 76 which has its core 77 connected to and a part of the piston rod 14 in the emergency switch valve 11. The other side of the coil 76 is connected by the wire 78 to the terminal 79. The terminal 80 is connected by the wire 81 to ground. The terminal 82 is connected by the wire 83 to the wire 51 of the rail brake energizing circuit. The controller 68 is provided on its drum with a plurality of contact fingers. Contact fingers 84, 85 and 86 which are connected together by the line 87 engage respectively the contacts 71, 82 and 79.

The contacts 88, 89 and 90 that are connected together by the wire 91 respectively engage the contacts 80, 74 and 73.

When the controller is moved so that the contact fingers 84, 85, 86, 88, 89 and 90 make contact with the contacts 71, 82, 79, 80, 74 and 73, the following events take place. The coil 76 is energized and the valve 16 opens the port 17, permitting the application of air from the tank 21 through pipe 20, chamber 19, port 17, chamber 22, line 23 to move the contact controlling piston 26 so that the contact member 29 engages the terminals 30 and 31. This results in energizing the circuit, battery 69, line 70, terminal 71, contact finger 84, wire 87, contact finger 85, contact 82, line 83, lines 51 and 41, terminals 30 and 31, line 42, solenoid coil 43, and thence to ground 44.

It also results in closing the circuit 32, 51, 83, 82, 85, 87, 84, 71, 70, battery 69, 72, 73 and thence through the controller to the line 81. This serves to energize the rail brake shoe applying circuit through the wire 52 and coils 53 to the ground 54.

*Method of operation*

When the main power source is connected, the straight air may be applied through pipe 5 by the controller handle 2. This will result in the closing of the rail brake applying and rail brake energizing circuits as described. In the event that the main power source is disconnected, then the emergency rail brake shoe applying and energizing circuits will be brought into play by the application of the emergency air from the source 62 or 21 for rotating the controller into engaging position. This results in opening the valve 16 and applying the air for making contact to close the rail brake shoe applying circuit and rail brake shoe energizing circuits so that the operation of the mechanism may continue as heretofore described in its normal operation. It is to be understood that the foregoing description relating to the operation of the apparatus when "straight air" is used and when the emergency air is used, comes to this:

(*a*) That when conditions of the apparatus are normal and the "straight air" is to be used, the handle 2 of the air valve 1 is turned to let the straight air supply pass from the feed pipe 3 to the distributing pipe 5. This pipe, as the parts are shown in Figures 1 and 2, will discharge straight air into the chamber 12 of the emergency air valve 11. From chamber 12 the air passes to the branch 24 of the pipe 23 and thence into the cylinder 25 with the result of moving the piston to the right to place the contact 29 in touch with the circuit terminals 30, 31, 32 and 33, whereby the brake shoe is energized and applied or positioned with respect to the rail, which results in the magnetic force between the shoe and the rail acting to give the final instantaneous short movement of the shoe downward and against the rail.

(*b*) That when for any cause, the straight air line is out of commission or put out of commission, and, therefore, the emergency air is to be used to actuate the piston 26 in the cylinder 25 to advance the switch 29 into contact with the terminals 30, 31, 32 and 33, for the purpose and with the result just stated, then the auxiliary air supply comes into action. The emergency air is found in tank 21, for instance, and through the pipe 20 the air under pressure in such tank is delivered into the chamber 19 of the valve 11, with the parts in the position shown in Figure 3. The valve 15 and its upper valve portion 16 have then been lowered, which closes off the straight air line 5 and lets the emergency air pass through the port 17 and thence into the pipe 23 and from there into the cylinder 25 to actuate the piston 26 which places the switch 29 in contact with said several terminals 30, 31, 32 and 33, as also shown in Figure 3.

(*c*) That as the switch 29 makes contact with the terminals 30 and 31, the circuit for applying or positioning the shoe with respect to the rail is closed, and as the switch proceeds quickly to reach terminals 32 and 33, the circuit which energizes the brake shoe becomes closed and the shoe is energized.

These two acts of applying or positioning and energizing the brake shoe are practically simultaneous so quick is the movement of the switch in making these contacts with these four terminals.

It will be understood that we desire to comprehend within this invention such modifications as may be necessary to adapt it to varying conditions and uses.

Having thus fully described our invention, what we claim as new and desire to secure by Letters Patent, is:

1. In a rail-brake system, the following instrumentalities: (*a*) magnetic rail-brakes; (*b*) means for applying or positioning and energizing them; (*c*) a primary source of electric current; (*d*) a secondary source of electric current; and (*e*) means for supplying said magnetic rail-brakes with current from the secondary source should the primary source fail.

2. In a rail-brake system, the following instrumentalities: (*a*) a magnetic rail-brake; (*b*) means for positioning or applying said rail-brake with respect to the rail; (*c*) means for energizing said rail-brake to cause it to magnetically bear on the rail; (*d*) a main-power-source for so energizing the rail-brake; (*e*) means selectable at will for connecting said rail-brake applying or positioning and energizing means to such power source; (*f*) a supplementary power source; and (*g*) means which, upon the failure of the main-power-source, will automatically connect said brake-applying or positioning and brake-energizing means to such supplementary power source; whereby upon the disruption of the main-power-source the rail-brake will nevertheless be applied or positioned and energized.

3. In a rail-brake system, the following instrumentalities: (*a*) a magnetic rail-brake; (*b*) means for applying or positioning said magnetic rail-brake; (*c*) means for energizing said magnetic rail-brake; (*d*) means operable at the will of the operator for applying or positioning and energizing said magnetic rail-brake; and (*e*) means for automatically applying or positioning and energizing said magnetic rail-brake irrespective of the action of the operator.

4. In combination, in a rail-brake system, (*a*) a magnetic rail brake; (*b*) means for applying or positioning such brake; (*c*) means for energizing the brake; (*d*) and hand-controlled means usable at the will of the operator to cause said applying or positioning means and said energizing means to function; (*e*) and automatic means for applying or positioning and for energizing said rail brake irrespective of the action of the operator; (*f*) and means for supplying electrical energy which is utilized when the operator applies or positions and energizes the rail brake; and (*g*) means for supplying a different source of electrical energy when the first-mentioned source is disrupted.

5. In a rail-brake system, a magnetic rail brake, means to energize said brake, means for moving said brake into position where its energization will finally apply it to a rail, means under the control of an operator for actuating said rail brake applying and energizing means in succession, and means out of the control of the operator for applying and energizing said rail brake automatically.

6. In a rail-brake system, a magnetic rail brake, means to energize said brake, means for moving said brake into position where its energization will finally apply it to a rail, means under the control of an operator for actuating said rail brake applying and energizing means in succession, and means out of the control of the operator for applying and energizing said rail brake automatically upon the failure of a main power source for applying and energizing the rail brake.

7. In a rail-brake system comprising magnetic rail brakes, means to energize the rail brakes for braking on a rail, means for selectively energizing said rail brakes at the will of an operator, and means for energizing said rail brake automatically irrespective of the will of the operator.

8. In a rail-brake system comprising magnetic rail-brakes, means to energize the rail-brakes for braking on a rail, means for selectively energizing said rail brakes at the will of an operator, means for energizing said rail brake automatically irrespective of the will of the operator, a main power source and a supplementary power source, said first mentioned power source being utilized when the operator energizes the rail brake and said supplementary power source being utilized automatically when the main power source fails.

9. In a rail-brake system, a magnetic brake shoe, electrically actuated means for moving said shoe into braking position, a circuit therefor, a magnetizing circuit, means of supplying electrical energy from a main power source to said circuits, an air operated means adapted to open and close said circuits, means of controlling said air comprising operator controlled means when the system is supplied with current from the main power source, automatically controlled means for opening and closing said circuit when the main power source is inoperative, and a supplementary power source for connection in the circuits in such an event.

10. In a magnetic brake system, a magnetic brake, a main power source, means to connect said magnetic brake thereto for magnetization thereof, means for opening and closing the connection thereto of the main power source with the magnetic brake, a supplementary power source likewise adapted to be connected to said magnetic brake, and means adapted to operate to automatically connect the supplementary power source when the main power source is rendered inoperative.

11. In a braking system, a main supply of air, a controller for applying air, a closing switch operated by said air, a supplementary air supply adapted to operate said switch, means for selecting the source of air to be utilized for closing the switch, a main electrical power source, a magnetic brake adapted to be energized and applied thereby, the connection between the brake and the main power source being regulated by said switch, and means for operating said switch automatically from the supplementary air supply in the event the main power source fails.

12. In a braking system, a main supply of air, a controller for applying air, a closing switch operated by said air, a supplementary air supply adapted to operate said switch, means for selecting the source of air to be utilized for closing the switch, a main electrical power source, a magnetic brake adapted to be energized and applied thereby, the connection between the brake and the main power source being regulated by said switch, means for operating said switch automatically from the supplementary air supply in the event the main power source fails, and a supplementary electric power source adapted to be connected into the circuit with the magnetic brake upon the failure of the main electric source.

13. In a braking system, a main supply of air, a controller for applying air, a closing switch operated by said air, a supplementary air supply adapted to operate said switch, means for selecting the source of air to be utilized for closing the switch, a main electrical power source, a magnetic brake adapted to be energized and applied thereby, the connection between the brake and the main power source being regulated by said switch, means for operating said switch automatically from the supplementary air supply in the event the main power source fails, a supplementary electric power source adapted to be connected into the circuit with the magnetic brake upon the failure of the main electric source, and means associated with the supplementary electric power source for switching the supply of air from the main air supply to the supplementary air supply.

14. In a braking system, a main supply of air, a controller for applying air, a closing switch operated by said air, a supplementary air supply adapted to operate said switch, means for selecting the source of air to be utilized for closing the switch, a main electrical power source, a magnetic brake adapted to be energized and applied thereby, the connection between the brake and the main power source being regulated by said switch, means for operating said switch automatically from the supplementary air supply in the event the main power source fails, a supplementary electric power source adapted to be connected into the circuit with the magnetic brake upon the failure of the main electric source, means associated with the supplementary electric power source for switching the supply of air from the main air supply to the supplementary air supply, and means of connecting the suplementary eelctric power source into the circuit by actuating it from a supplementary supply of air when the main electric power source fails.

15. In a braking system, a magnetic brake, an electric circuit means for applying or positioning and for energizing said brake, a switch (as 29) for connecting said electric circuit means to a main electric source, a supplementary electric source (as 69), means of connecting said supplementary electric source into the circuit, means of controlling said connection to the supplementary electric source for the connection thereof when the main power source fails, and a source of air under pressure for actuating the means which connects the supplementary power source in circuit.

16. In a braking system, a magnetic brake, an electric circuit means for applying or positioning and for energizing said brake, a switch (as 29) for connecting said electric circuit means to a main electric source, a supplementary electric source (as 69), means of connecting said supplementary electric source into the circuit, means of controlling said connection to the supplementary electric source for the connection thereof when the main power source fails, a source of air under pressure for actuating the means which connects the supplementary power source in circuit, and means connected with said supplementary air source for closing the switch for connecting with the main power source or the supplementary electric power source to the magnetic brake.

17. In a braking system, a magnetic brake, an electric circuit means for applying or positioning and for energizing said brake, a switch (as 29) for connecting said electric circuit means to a main electric source, a supplementary electric source (as 69), means of connecting said supplementary electric source into the circuit, means of controlling said connection to the supplementary electric source for the connection thereof when the main power source fails, a source of air under pressure for actuating the means which connects the supplementary power source in circuit, means connected with said supplementary air source for closing the switch for connecting with the main power source of the supplementary electric power source to the magnetic brake, a main air source and a controller for manually controlling the closing of the switch means by the main air supply.

18. In a magnetic brake system, a main electrical supply, a supplementary electrical supply, a common circuit for energizing and applying a magnetic brake, a magnetic brake having energizing and applying means, a common switch for closing the applying and energizing circuits, a switch for connecting the supplementary supply in circuit, means controlled by the main power circuit for rendering said switch inoperative until the main power circuit fails, power means for then actuating said switch means to close it to connect the supplementary electric power source, and means for connecting said power means to actuate the switch closing means to connect the magnetic brake to one of said electric power sources.

19. In a magnetic brake system, means of supplying a main air supply, a controller therefor, means of supplying a supplementary air supply, an automatic switch for selecting the application of the respective supplies, a closure switch actuated by either of said supplies, electric circuits for energizing and applying magnetic brakes, magnetic brakes and applying means, a main power circuit adapted to be connected thereto, means in the main power circuit for rendering a supplementary electric power circuit inoperative until the main power circuit fails, a supplementary electric power source, means connected thereto for operating the selecting means for applying the air, and means by which said supplementary air source can connect the supplementary electric source in circuit.

20. In a magnetic brake system, a main air supply, a controller, an emergency switch valve cooperating with an emergency air line, a supplementary air source, an air actuated closing switch, a magnetic brake, a magnetic brake circuit, a main power circuit, a supplementary power circuit, means in the supplementary power circuit for actuating the emergency switch valve, and means actuated by the supplementary air for connecting the supplementary electric power source in circuit when the main power source goes out of circuit.

21. In combination in a magnetic brake system, a magnetic brake, a circuit for applying and energizing the brake, a main power source, a supplementary power source, air operated switch means for connecting the supplementary power source rendered operative when the main power source fails, air actuated means for connecting the brake to either of the electric power sources, and means electrically connected to the supplementary power source for actuating said switch when the main power source fails.

22. In combination in a magnetic brake system, a magnetic brake, a circuit for applying and energizing the brake, a main power source, a supplementary power source, air operated switch means for connecting the supplementary power source rendered operative when the main power source fails, air actuated means for connecting the brake to either of the electric power sources, means electrically connected to the supplementary power source for actuating said switch when the main power source fails, and means for manually controlling the air actuation of said switch means for connecting the main power source to the brake when the main power source is operative.

THEODORE H. SCHOEPF.
DAVID M. RITCHIE.